J. BURKE.
VARIABLE SPEED MOTOR.
APPLICATION FILED MAY 17, 1905.

913,691.

Patented Mar. 2, 1909.
2 SHEETS—SHEET 1.

Witnesses
S. K. Sager
Geo. K. Kerr

James Burke Inventor
By his Attorney
C. V. Edwards

J. BURKE.
VARIABLE SPEED MOTOR.
APPLICATION FILED MAY 17, 1905.

913,691.

Patented Mar. 2, 1909.
2 SHEETS—SHEET 2.

Witnesses
S. R. Sager
Goucher

James Burke  Inventor
By his Attorney C. V. Edwards

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

VARIABLE-SPEED MOTOR.

No. 913,691.

Specification of Letters Patent.

Patented March 2, 1909.

Application filed May 17, 1905. Serial No. 260,859.

*To all whom it may concern:*

Be it known that I, JAMES BURKE, a citizen of the United States, residing at Erie, in the county of Erie and State of Pennsylvania, have invented certain new and useful Improvements in Variable-Speed Motors, of which the following is a full, clear, and exact specification.

My invention relates to electric machines and particularly to a form of electric motor and method of operating a motor for obtaining variable speeds.

The object of my invention is to provide a variable speed motor which will be simple in construction and capable of operating at a large number of speeds from a single pair of supply wires of constant electromotive force.

In accordance with my invention, I provide a motor of the usual direct current type with additional coils or windings which are connected to a common point, the potential of which remains fixed and which is between the potential of the positive and negative brushes. By connecting the supply mains to the positive and negative brushes, the motor will operate at a certain speed and by connecting to the additional point of fixed potential, instead of to one of the brushes named, the motor will operate at approximately twice the speed. I also provide means for varying the field strength so that a series of speeds may be obtained graduated by small steps. My improved form of motor may also be used as a transformer.

My invention relates to my improved type of machine particularly described in my pending application Serial No. 355,564, filed February 4, 1907, and my present invention will be understood by reference to the accompanying drawings and following description.

Figure 1:
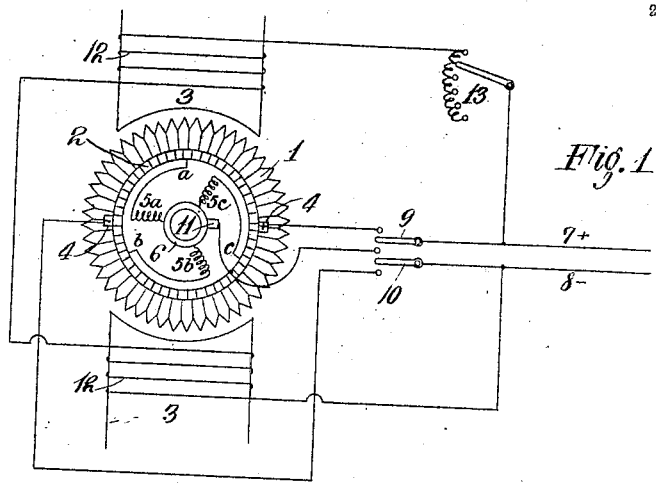
Figure 2:
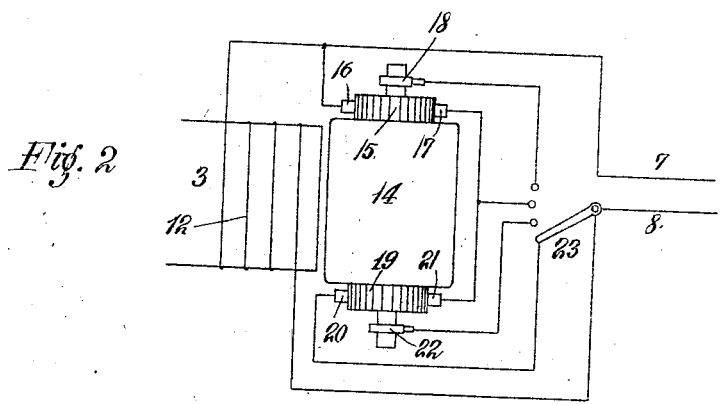
Figure 3:
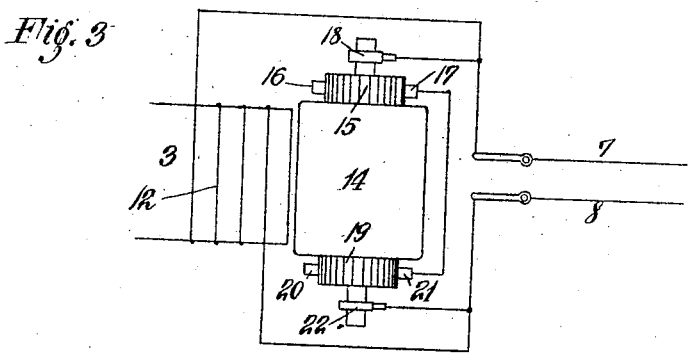
Figure 4:
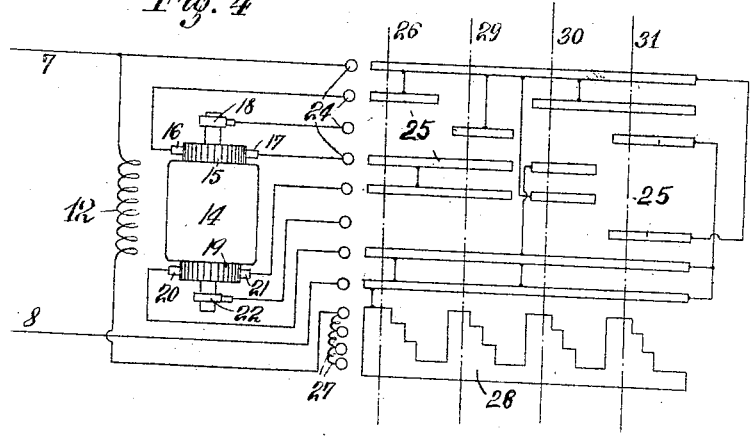
Figure 5:
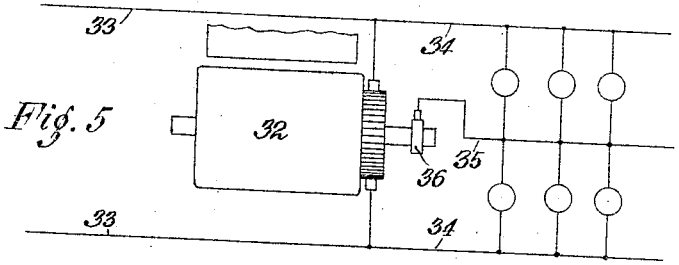
Figure 6:
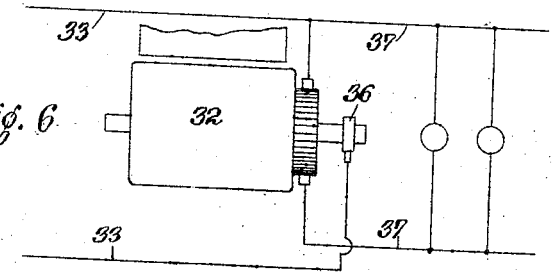

Figure 1 is a diagram of my improved motor and connections for operating the same at variable speeds; Figs. 2 and 3 are diagrams of modifications; Fig. 4 is a diagram of connections and development of controlling switch; Figs. 5 and 6 are diagrams of modifications.

Referring to Fig. 1, the armature winding of the usual form for direct current generators is indicated at 1 and the commutator at 2. The machine is shown in this instance as bipolar in form having the poles 3 and positive and negative brushes 4. In addition to the winding 1, I provide additional coils or windings $5^a$, $5^b$, $5^c$ wound upon the same core and preferably in the same slots, one end of each of the coils being connected to the collector ring 6. The other ends of the coils are connected to points $a$, $b$, $c$, in the armature which points in this example are 120 electrical degrees apart. The coils are shown connected to the commutator segments, but they may, if desired, be connected to points in the armature winding itself. The positive and negative supply conductors are indicated at 7, 8 and switches 9, 10 are shown for connecting the supply wires to positive and negative brushes 4 and to brush 11 which bears on the collector ring 6. The field winding 12 is connected across the supply conductors and through a variable resistance 13 for varying the strength of field.

The coils $5^a$, $5^b$, $5^c$, in operation generate an electromotive force which is always approximately equal to the difference in potential between the ring 6 and the points in the armature to which the coils are respectively connected and consequently the potential of ring 6 remains practically fixed at all times. For example, referring to the condition at the instant when the parts are in the position shown in Fig. 1, if the supply wires were connected to the brushes 4, the potential of point $a$ would be half way between that of the positive brush and that of the negative brush. The windings $5^a$, $5^b$, $5^c$, should each have such a number of turns that the maximum electromotive force generated by each one will be approximately one-half the electromotive force between the positive and negative brushes 4. By this requirement the turns in each alternating current winding should be one half the turns per circuit of the direct current winding. Since coil $5^a$ is shown passing through the neutral field, no electromotive force will be generated by it and ring 6 will therefore be at the same potential as point $a$, or approximately half way between the potential of brushes 4. Coil $5^b$ is connected to point $b$, the potential of which is between the potential of the negative brush and that of the neutral point. Coil $5^b$ is shown in such a position that it is generating a counter electromotive force equal to the difference in potential between that of point $b$ and of ring 6. The potential of point $c$ is below and is approaching that of the positive brush 4 and the position of coil $5^c$ is such that it generates a counter electromotive force equal to the difference in potential between that of point c and of ring 6. Consequently each of the coils $5^a$, $5^b$, $5^c$ tend to maintain the potential of ring 6 fixed and at a value approximately midway between that of the brushes 4. This is likewise true of each position of the armature as it rotates. Hence the windings or coils $5^a$, $5^b$, $5^c$, generate an alternating counter electromotive force in conjunction with the winding 1 and these additional coils tend to maintain a point of fixed potential at ring 6 midway between that of brushes 4.

In operating the motor, if the supply mains 7, 8 are connected to the brushes 4, the machine will operate at the usual speed and under full strength of field if all resistance 13 is cut out. The speed may now be increased by successive steps by inserting the field resistance 13. After the field is weakened to the desired degree, the resistance 13 may be cut out giving the full field strength again and one of the switches 9, 10, say switch 10 for example, will be thrown into connection with the brush 11. This condition will give practically double the speed obtained when the supply mains are both connected to brushes 4 and under the same field strength. This will be understood since the counter-electromotive force generated in coils or windings $5^a$, $5^b$, $5^c$, tends to maintain ring 6 at a fixed potential and at a value midway between the potential of positive and negative brushes 4 and these coils also serve as a path for the current from main 8 into the armature. Consequently the winding 1 or parts thereof are in effect subjected to twice the voltage received when the supply mains are connected to brushes 4. For example, in the position shown in Fig. 1, coil $5^a$ is generating no electromotive force and point a is therefore subjected to the potential of line 8 when switch 10 is connected electrically to brush 11 and the part of the winding between point a and the positive brush 4 is subjected to twice the voltage compared with the condition when line 8 is connected to negative brush 4. The electromotive force generated by coils $5^a$, $5^b$, $5^c$ is such as to maintain a corresponding relationship at all positions of the armature and the double speed referred to is obtained. The field strength may now be weakened again and increased speeds obtained.

I have described one form of my invention with reference to Fig. 1 and it will be understood that the form of the windings or coils and their connections may be changed in a variety of ways.

In Fig. 2 I have indicated a form of motor by which I obtain four different speeds from a single pair of supply wires and with constant field strength. The supply mains are shown at 7, 8. The field, which may be multipolar, is indicated at 3 and the field winding 12 is shown as a shunt winding connected across the mains 7, 8. The armature 14 is provided with duplicate windings of the type described with reference to Fig. 1; that is, there are two sets of windings not electrically connected on the armature core, each set comprising the usual direct current winding and commutator and an alternating current winding connected thereto at displaced points and to a collector ring as above described. In Fig. 2 the commutator of one winding is shown at 15, having brushes 16, 17 bearing thereon; the slip ring 18 is the ring to which the alternating current winding is connected. The commutator 15 corresponds to commutator 2 of Fig. 1 and the collector ring 18 corresponds to ring 6 of Fig. 1. The duplicate winding similarly has a commutator 19 with brushes 20 21 bearing thereon and also has the ring 22 connected to the alternating current winding. By means of the switch 23, which will shift one pole of the supply line, I may obtain four different speeds from the motor. The main 7 is shown connected to the brush 16, and the brushes 17, 21 are electrically connected. In the position shown, the switch 23 connects the supply main 8 to the brush 20. Current will then pass from one supply line to the other through the two commutator windings in series. This will give the lowest speed, which we may assume to be 100 revolutions. By shifting the switch so as to connect line 8 with the ring 22 through the brush bearing thereon, the speed will be increased. Since the electromotive force of the line is then applied to the ring 22 and brush 16, the full electromotive force of the line is applied to a part of the total winding. If we assume that the two sets of windings have the same number of conductors each, then with this connection three-fourths of the total conductors in the two commutator windings will receive the full potential of the line giving a speed of approximately 4/3 of 100 or 133. Upon shifting switch 23 to the next contact, the full electromotive force will be applied to one commutator winding, line 8 being connected to brush 17 and line 7 being connected to brush 16. The initial speed of the motor will now be doubled approximately, giving 200 revolutions. Further movement of switch 23 will connect line 8 to the collector ring 18. One half of one commutator winding then receives the full line electromotive force giving a speed of approximately 400 revolutions.

In Fig. 3 I have illustrated a connection which is different from that of Fig. 2 which could be used to give third speed of 200 revolutions. In the connection of Fig. 3, current from the line is introduced and taken from the motor through collector rings. This gives the very interesting condition of a motor operated by direct current, which current is transmitted to and from the motor through slip rings. With this arrangement, half of each commutator winding is connected in series with the other, the brushes 17 and 21 being connected. Continuing the example above referred to, the speed would then be 200 revolutions approximately, since half of each winding in series receives the full electromotive force of the line. I may obtain different ratios of speed from that above described by making the number of conductors in one set of the windings different from the number in the other set. That is, by proportioning the windings, I may vary the speed ratios as desired in particular cases.

In Fig. 4 are shown the connections and development of one form of controller by which a large number of speeds are obtained from a single pair of supply mains 7, 8. The similar parts of the motor are designated by the same reference characters as are used in Figs. 2 and 3. The connections from the motor extend to a series of contacts 24 adapted to engage with the conducting strips 25. When the contacts 24 are on line 26, the slowest speed will be obtained, the commutator windings being connected in series across the line and the field having its full strength. Further movement of the controlling switch will increase the speed by successively weakening the field strength. This is accomplished by inserting sections of the field resistance 27 in the field circuit. This resistance is shown as being made up of three sections connected to contacts and as the controlling switch is moved, the resistance sections are successively cut into the field circuit on account of the step form of the conductor 28. When contact is made on line 29, the field is given its full strength and the connections are such that one line is connected to ring 18 and the other to brush 20, there being one half of one winding connected in series with the other winding. This will give a further increase of speed over the previous step and the speed will be again increased by moving the controlling switch to cut in the field resistance by sections. In position on line 30, the field is given its full strength, but the increase in speed is obtained by applying the line electromotive force to each of the commutator windings, the latter being connected in parallel. After further increased speeds are obtained by weakening the field, the position on line 31 is reached which gives the field its full strength again and also connects two halves of the commutator windings in parallel, the line being connected to one commutator brush and the collector ring of each winding. The maximum speed is obtained by weakening the field while maintaining the parallel connection of the halves of the windings. While I have indicated one form of controlling switch which gives sixteen different speeds, it is evident that the form and arrangement of the parts might be varied to give the results desired in any particular instance. It will be understood that any suitable means for avoiding sparking at the switch may be used.

Fig. 5 illustrates another application of my invention. The armature 32 is provided with a winding of the general form described with reference to Fig. 1, that is, it has a commutator winding and the additional alternating current winding electrically connected thereto and coöperating therewith as above described. A two-wire supply circuit 33 is connected to the brushes bearing on the commutator and energy from this circuit serves to operate the machine as a motor. The outside wires 34 of a three-wire system are connected to the commutator brushes or mains 33, and the neutral wire 35 is connected to the brush bearing on the collector ring 36 which is connected to the alternating current coils. Under this condition the machine will operate as a motor and transform the two-wire system into a three-wire distributing system. When thus operating as a motor, the coils connected to ring 36 will maintain the potential of the ring approximately constant and about half way between the potential of the outside wires. Lamps or other translating devices may then be connected between the neutral and outside wires, and the alternating current or balancing windings will serve as a path through the machine for any unbalanced current and also maintain the potential of the neutral approximately constant.

Fig. 6 shows an arrangement in which the machine operates as a rotary converter to change the voltage. Here the supply mains 33 are connected, one to one commutator brush and the other to the brush engaging the ring 36. The armature will rotate as a motor when thus supplied with energy and current may be taken off the commutator brushes to supply a two-wire circuit 37 with energy of double the voltage of the supply circuit. Also if the mains 37 were the supply wires, the mains 33 could be supplied with energy of one-half the voltage giving a decrease of electromotive force instead of an increase.

My invention is susceptible of many modifications and embodiments in various forms of construction, and I am not limited except as indicated in the following claims.

Having thus described my invention, I declare that what I claim as new and desire to secure by Letters Patent, is,—

1. In an electric motor, the combination with an armature winding having a commutator, of brushes on the commutator for applying the line voltage to said winding, and means comprising an additional dynamo electric generating winding for applying the line voltage to a part of said first named winding.

2. In an electric motor, the combination with an armature winding having a commutator, of brushes on the commutator for applying the line voltage to said winding, means comprising an additional dynamo electric generating winding for applying the line voltage to a part of said first named winding, and means for varying the field strength.

3. In an electric motor, the combination with an armature winding having a commutator, of brushes on the commutator for applying the line voltage to said winding, and means comprising an additional dynamo electric generating winding for applying the line voltage to approximately one-half of said first named winding.

4. In an electric motor, the combination with an armature winding having a commutator, of positive and negative brushes on said commutator, a second winding wound upon the main armature core for balancing said first mentioned winding, and means for connecting the line wires to said brushes of opposite polarity for obtaining one speed and to one of said brushes and to said second winding for obtaining another speed.

5. In an electric motor, the combination of a winding having a commutator, brushes on said commutator, a second dynamo electric generating winding connected to said first winding and to a collector ring, and means for connecting the supply line to said brushes and for connecting one supply line to said ring.

6. In an electric motor, the combination of a winding having a commutator, brushes on said commutator, a second dynamo electric generating winding connected to said first winding and to a collector ring, means for connecting the supply line to said brushes and for connecting one supply line to said ring, and means for varying the field strength.

7. In an electric motor, an armature core, a winding thereon having a commutator, a second winding thereon having a commutator, and means for connecting a part only of one of said windings in series with the other of said windings.

8. In an electric motor, an armature core, a winding thereon having a commutator, a second winding thereon having a commutator, and means for connecting parts only of said windings in parallel with each other.

9. In an electric motor, an armature core, a winding thereon having a commutator, a second winding thereon having a commutator, a controlling switch, and means whereby movement of the controlling switch connects said windings in series or in parallel, or connects parts of said windings in series or in parallel.

10. In an electric motor, an armature core, a winding thereon having a commutator, a second winding thereon having a commutator, a controlling switch, and means whereby movement of the controlling switch connects said windings in series or in parallel, or parts of said windings in series or in parallel, and means for varying the field strength.

11. In an electric motor, an armature core, a winding thereon having a commutator, a balancing winding on said core connected to said winding and to a collector ring, a second winding on said core having a commutator, a balancing winding on said core connected to said second winding and to a collector ring, a controlling switch, and connections whereby movement of the controlling switch connects said windings in series or in parallel, or parts of said winding in series or in parallel.

12. The method of operating an electric motor, which consists in subjecting the electromotive force of the supply line to the commutator brushes to obtain one speed, and dynamically generating an electromotive force to maintain a point of fixed potential between that of the brushes and subjecting only part of the armature to the electromotive force of the supply line for obtaining another speed.

13. The method of operating an electric motor, which consists in subjecting the electromotive force of the supply line to a winding thereof to obtain one speed, dynamically generating a less electromotive force to maintain a point of fixed potential and subjecting only part of said winding to the electromotive force of the supply line for obtaining another speed.

In testimony whereof I affix my signature, in presence of two witnesses.

JAMES BURKE.

Witnesses:
  A. O. CHAPIN,
  C. V. EDWARDS.